United States Patent [19]

Miller

[11] Patent Number: 5,133,177
[45] Date of Patent: Jul. 28, 1992

[54] ADJUSTABLE RAKE

[76] Inventor: Edward C. Miller, 126 Reynolds Dr., Meriden, Conn. 06150

[21] Appl. No.: 669,527

[22] Filed: Mar. 14, 1991

[51] Int. Cl.⁵ .............................................. A01D 7/04
[52] U.S. Cl. ............................ 56/400.160; 56/400.18; 56/400.19
[58] Field of Search ............... 56/400.18, 400.1, 400.4, 56/400.16, 400.17, 400.19, 400.2, 400.21

[56] References Cited

U.S. PATENT DOCUMENTS

| | | |
|---|---|---|
| 1,916,052 | 12/1932 | Jenkins . |
| 2,032,954 | 11/1934 | Reichard . |
| 2,222,163 | 3/1938 | Austin . |
| 2,532,526 | 9/1947 | Wells . |
| 2,767,545 | 10/1956 | Jenkins ............................ 56/400.18 |
| 3,855,766 | 12/1974 | Lutz . |
| 4,054,313 | 10/1977 | Ciuci ........................... 56/400.19 X |

Primary Examiner—Terry Lee Melius
Attorney, Agent, or Firm—Chilton, Alix & Van Kirk

[57] ABSTRACT

A rake having an adjustable width or span. The rake has two pivoting rake segments attached to an elongated handle. The rake segments are hinged to a tubular sleeve which is slidably mounted to the middle portion of the handle. The width of the rake can be adjusted by sliding the sleeve along the rake handle. The operator need not interrupt the raking process in order to adjust the rake width.

19 Claims, 3 Drawing Sheets

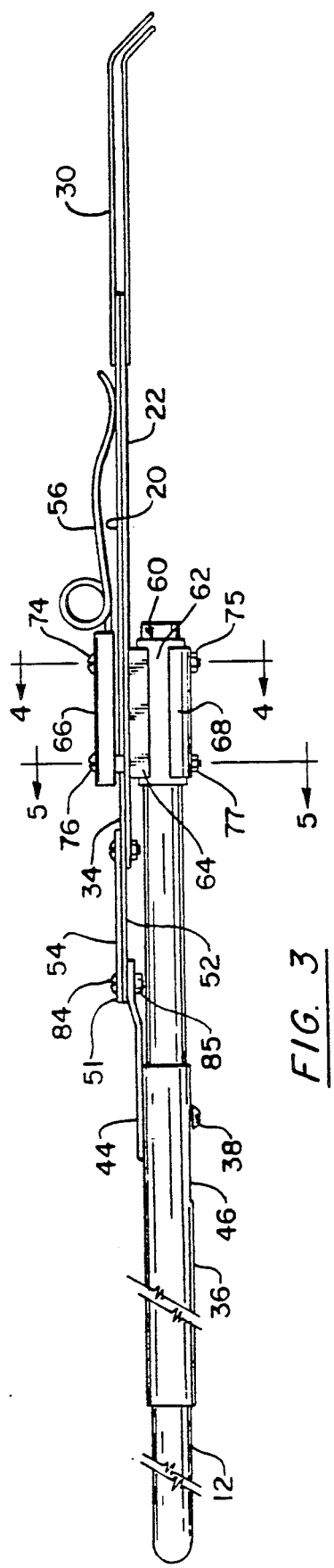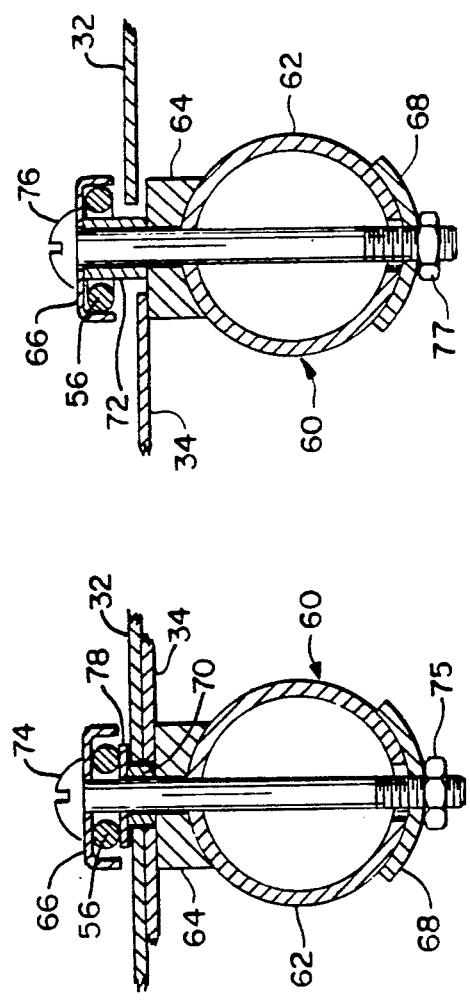

ADJUSTABLE RAKE

BACKGROUND OF THE INVENTION

The present invention generally relates to rakes and more particularly relates to rakes having an adjustable width.

Rakes of different widths often are used for raking different areas of a particular yard. Rakes having a wide span are useful for grass, while narrower rakes are often preferred for raking between shrubbery or other obstacles. While it is feasible to have rakes of different sizes on hand and switch from one rake to another when raking different parts of the yard, the switching process requires an expenditure of energy and effort and can result in lost time.

SUMMARY OF THE INVENTION

An object of the invention is to provide a rake which is readily adapted for raking an open space such as a lawn, and for raking between shrubs or other closely spaced obstacles.

Another object of the invention is to provide a rake having a width or span which can be manually adjusted without requiring the raking motion to be interrupted.

Another object of the invention is to provide a rake having a width or span that can be adjusted very quickly and with minimal effort.

Yet another object of the invention is to provide an adjustable rake which will maintain one of two widths without being physically locked into either position.

Briefly stated, the invention is a rake comprising an elongated handle, an active section including first and second rake segments pivotally mounted to one end of the handle, a sleeve slidably mounted around the middle portion of the handle, and a hinge which connects the sleeve to the active section such that the rake segments pivot relative to each other when the sleeve moves along the handle.

The rake segments are pivotally mounted to the handle on parallel pivot axes. Each rake segment includes a frame having a plurality of teeth fixed thereto, extending outward from the frame in a first direction. The rake segments are pivotally movable in a lateral direction from a first arrangement to a second arrangement, and vice versa. In the first arrangement, the rake segments have a greater degree of overlap than they have in the second arrangement. The sleeve is slidable along a portion of the length of the handle, between first and second positions. A hinge connects the sleeve to the pivotable rake segments in such a way that the rake segments are in the first arrangement when the sleeve is in the first position, and the rake segments are in the second arrangement when the sleeve is in the second position.

In a preferred embodiment of the invention, the rake has a spring which bears against the frame of the first rake segment, and the first and second positions of the sleeve are defined by stop means formed on the sleeve and elongated handle. The rake segments are fan-shaped and are mounted to the handle, one over the other, on a single pivot axis. Each rake segment has a rake segment leg extending outward from the frame in a direction away from the teeth. The rake segments substantially overlap each other in the first arrangement, and are substantially adjacent each other in the second arrangement. Preferably, the hinge is V-shaped, having first and second hinge legs pivotally attached to each other at one end, forming the vertex of the "V". The vertex is pivotally attached to the sleeve via a rod. One end of the rod is attached to the pivotable vertex, and the other end of the rod is secured to the sleeve. The opposite ends of the first and second hinge legs are pivotally attached to the legs of the first and second rake segments, respectively. The angle of the "V" changes as the sleeve is slid along the handle.

The design of the rake enables the user to slide the sleeve along the handle to change the width of the active section in a fraction of a second, without interrupting the raking motion, and using minimal effort. When the rake segments are in the first arrangement, the rake has a narrow span, and when the rake segments are in the second arrangement, the rake has a wide span.

BRIEF DESCRIPTION OF THE DRAWINGS

FIG. 3 is a side view, partly broken away, of the adjustable rake illustrated in FIGS. 1 and 2;

FIG. 4 is a sectional view of the adjustable rake taken along line 4—4 of FIG. 3; and FIG. 5 is a sectional view of the adjustable rake taken along line 5—5 of FIG. 3.

DETAILED DESCRIPTION OF THE PREFERRED EMBODIMENT

Figure 1:
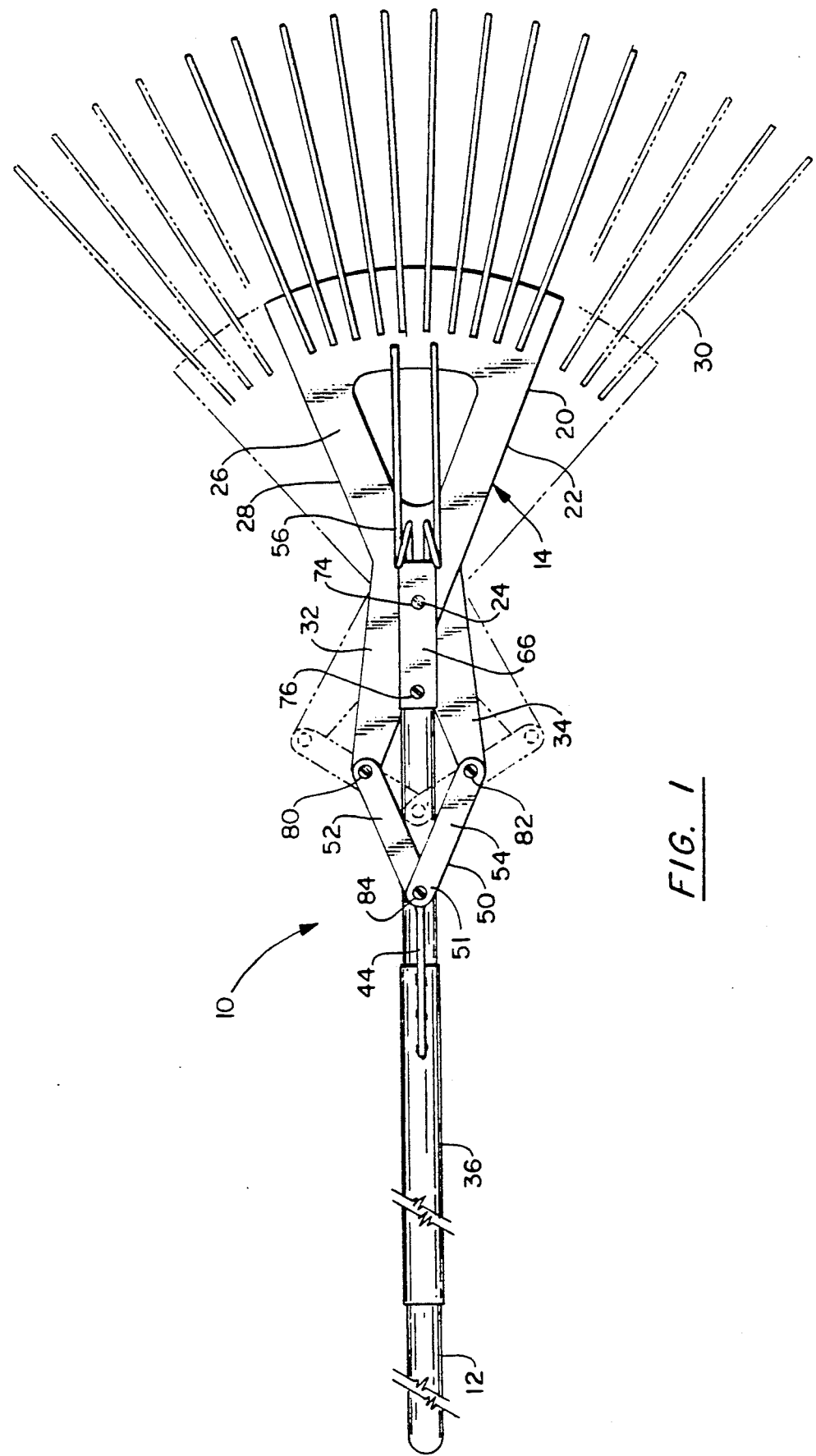
FIG. 1 is a top view, partly broken away, of an adjustable rake according to the invention.
Figure 2:
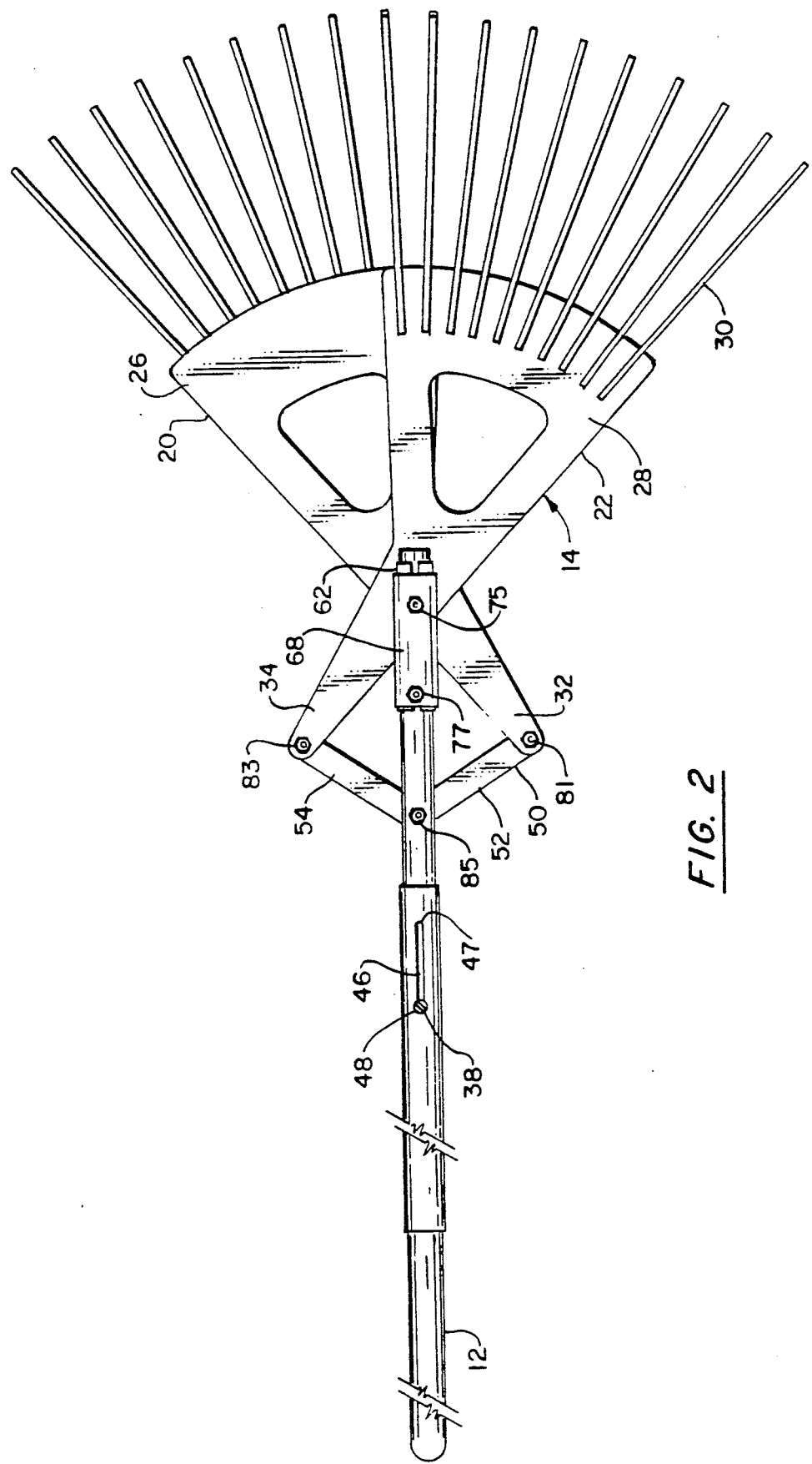
FIG. 2 is a bottom view, partly broken away, of the adjustable rake illustrated in FIG. 1.

Referring now to the drawings wherein like numerals represent the same or like parts throughout, an adjustable rake 10 is shown comprising an elongated wooden handle 12, and a metal active section 14 including first and second fan-shaped rake segments 20,22 pivotally mounted at their bases to one end of the handle, the first rake segment 20 overlapping the second rake segment 22 at the common pivot point 24. The first and second rake segments 20,22 have first and second frames 26,28, a plurality of teeth 30 of approximately equal length fixed to the frames and extending outward away from the handle in an essentially uniform direction, and first and second rake segment legs 32,34 secured to the first and second frames 26,28, respectively, and projecting out from the frames in a direction opposite the direction of the teeth 30. The rake segments 20,22 are pivotally movable laterally relative to each other between a substantially completely overlapping arrangement, illustrated in FIG. 1, and a substantially non-overlapping arrangement, illustrated in FIG. 2 (and shown in phantom in FIG. 1).

A metal sleeve 36 is slidably mounted around the middle portion of the handle 12. The sleeve 36 can be moved between first and second positions defined by a stop screw 38, shown in FIG. 2, which bears against the stop slot 46, formed near the active section 14 on the bottom side of the sleeve 36, at first end 47 or second end 48. The sleeve 36 has a length which is sufficient to enable the user of the rake to place one hand on the sleeve 36 and another hand on the part of the handle 12 which is on the opposite end of handle 12 from the active section 14.

A V-shaped metal hinge 50 is pivotally mounted at its vertex 51 to the end of rod 44 which is near the active section 14. A first hinge leg 52 is pivotally attached to the first rake segment leg 32. A second hinge leg 54 is pivotally attached to the second rake segment leg 34. The angle of the vertex 51 of the V-shaped hinge 50 changes as the sleeve 36, and hence the rod 44, slides along the handle 12.

A spring 56 is mounted on the handle 12 and bears against the top side of the first rake segment 20. The spring 56 prevents pivotal movement of the rake segments 20,22, and therefore also prevents sliding of the sleeve 36, unless the operator deliberately moves the sleeve 36 in order to change the pivotal orientation of the rake segments 20,22. The spring 56 also helps to prevent bending and deformation of the active section 14 during use of the rake 10.

The component parts of the rake described above are assembled with nuts and bolts, and are supported with a variety of support pieces. The connection between the active section 14 and the handle 12 is reinforced by a rake support 60, shown in FIGS. 3-5, which includes a slotted cylindrical metal tube 62 secured to a rectangular frame support member 64. The tube 62 is mounted around the handle 12, and the rake segment frames 26,28 are placed on the frame support member 64, with the second frame 28 between the first frame 26 and the frame support member 64. Spring guard 66 covers one end of the spring 56 in order to hold the spring 56 in place. A support keeper 68 holds the noncontiguous walls of slotted tube 62 securely around the handle 12. First and second hollow cylindrical spacers 70,72 allow for pivotal movement of each of the rake segments 20,22 around a bolt 74 and proximate bolt 76.

The bolt 74 penetrates the spring guard 66, a washer 78, the first spacer 70, the first and second rake segments 20,22, the rake support 60, and the support keeper 68, and is fastened by a nut 75. Proximate bolt 74, the spring 56 is sandwiched between the spring guard 66 and the washer 78, and bears against the washer 78. The bolt 76 penetrates the spring guard 66, second spacer 72, rake support 60 and support keeper 68, and is fastened by a nut 77. The spring 56 bears against the inner side of the spring guard 66. The first and second rake segments 20,22 are movable in the space between spring guard 66 and rectangular frame support member 64. A bolt 80 and a nut 81 join the first hinge leg 52 and the first rake segment leg 32. A bolt 82 and a nut 83 join the second hinge leg 54 and the second rake segment leg 34. A bolt 84 and a nut 85 join the first hinge leg 52, the second hinge leg 54, and the rod 44 at the hinge vertex 51.

The pivotal relationship between the first and second rake segments 20,22 is controlled by sliding the sleeve 36 along the handle 12. The slot 46 with the stop screw 38 inserted therein limits the sliding of the sleeve 36 within a particular range. When the sleeve 36 is slidably moved toward the rake segments 20,22, until the first end 47 of the slot 46 is adjacent the stop screw 38, the first and second rake segments 20,22 are essentially non-overlapping, thereby forming a rake with an active section about 24 inches wide at its widest end. When the sleeve 36 is slidably moved away from the rake segments 20,22, until the second end 48 of the slot 46 is adjacent the stop screw 38, the first and second rake segments 20,22 are essentially overlapping, thereby providing an active section having a width of about 12 inches at its widest end. When sleeve 36 is arranged in either the first or second position, it will not slide to the other position without an application of force by the user, because of resistance which is due to the force of the spring.

In the preferred embodiment of the invention, the first rake segment frame 26 is formed integrally with the first rake segment leg 32 and the second rake segment frame 28 is formed integrally with the second rake segment leg 34. The rake segment frames 26,28 and the rake segment legs 32,34 are made of 16 gauge galvanized steel. The teeth 30 are made of tempered or spring steel, and the V-shaped hinge 50 is made of 16 gauge galvanized steel. The support components, including the rake support 60, spring guard 66, and first and second spacers 70,72, are made from carbon steel. The bolts 80,82 and 84 can be replaced by rivets for reasons of economy.

It is to be understood that the description of what is presently considered to be the preferred embodiment is not intended to limit the scope of the invention. Various modifications and equivalent arrangements are contemplated, and are included within the scope of the claims.

What is claimed is:

1. A rake comprising:
   an elongated handle having a first end, a second end, and a middle portion,
   an active section including first and second rake segments pivotally mounted on the first end of the handle along parallel first and second pivot axes, respectively, each rake segment having a frame and a plurality of teeth fixed to the frame and extending outward from the frame in a direction away from the handle, the rake segments being pivotally movable laterally between a first working arrangement and a second working arrangement without requiring interruption of raking motion, the rake segments having a greater degree of overlap in the first working arrangement than in the second working arrangement,
   a sleeve slidably mounted to the middle portion of the handle, the sleeve being movable between a first position and a second position, and
   hinge means for connecting the slidable sleeve to the pivotable rake segments, the rake segments being positioned in the first working arrangement when the sleeve is in the first position and in the second working arrangement when the sleeve is in the second position.

2. A rake according to claim 1, further comprising spring means fixed to the handle, the spring means bearing against the frame of the first rake segment.

3. A rake according to claim 2, further comprising stop means formed on the sleeve and elongated handle, the stop means defining the first and second positions of the sleeve.

4. A rake according to claim 1, wherein the first and second rake segments are substantially overlapping in the first arrangement and substantially laterally adjacent each other in the second arrangement.

5. A rake according to claim 4, wherein the first and second pivot axes of the first and second rake segments are the same.

6. A rake according to claim 5, wherein each of the first and second rake segments is substantially fan-shaped.

7. A rake according to claim 1, wherein the hinge means includes first and second hinge legs, the first hinge leg being pivotally attached to the sleeve and pivotally attached to the first rake segment, and the second hinge leg being pivotally attached to the sleeve and pivotally attached to the second rake segment.

8. A rake according to claim 7, wherein the first and second hinge legs form a V-shape, and the first and second hinge legs pivot relative to the sleeve around the same axis, the angle of the V being smaller when the rake segments are in the first arrangement than in the second arrangement.

9. A rake according to claim 8, wherein the first and second rake segments have first and second rake segment legs, the first rake segment leg having a first end fixed to the frame and a second end pivotally attached to the first hinge leg, the second rake segment leg having a first end fixed to the frame and a second end pivotally attached to the second hinge leg.

10. A rake according to claim 9, wherein the first and second hinge legs are connected to the sleeve by a rod, the rod being fixed to the sleeve and extending toward the active section.

11. A rake comprising:
an elongated handle having a first end, a second end, and a middle portion,
an active section including first and second rake segments pivotally mounted on the first end of the handle along parallel first and second pivot axes, respectively, each rake segment having a frame and a plurality of teeth fixed to the frame and extending outward from the frame in a direction away from the handle, the rake segments being pivotally movable laterally between a first arrangement and a second arrangement, the rake segments having a greater degree of overlap in the first arrangement than in the second arrangement,
a sleeve slidably mounted to the middle portion of the handle, the sleeve being movable between a first position and a second position, and
hinge means for connecting the slidable sleeve to the pivotable rake segments, the hinge means including first and second hinge legs, the first hinge leg being pivotally attached to the sleeve and pivotally attached to the first rake segment, the second hinge leg being pivotally attached to the sleeves and pivotally attached to the second rake segment, the rake segments being positioned in the first arrangement when the sleeve is in the first position and in the second arrangement when the sleeve is in the second position.

12. A rake according to claim 11, further comprising spring means fixed to the handle, the spring means bearing against the frame of the first rake segment.

13. A rake according to claim 12 further comprising stop means formed on the sleeve and elongated handle, the stop means defining the first and second positions of the sleeve.

14. A rake according to claim 11, wherein the first and second rake segments are substantially overlapping in the first arrangement and substantially laterally adjacent each other in the second arrangement.

15. A rake according to claim 14, wherein the first and second pivot axes of the first and second rake segments are the same.

16. A rake according to claim 15, wherein each of the first and second rake segments is substantially fan-shaped.

17. A rake according to claim 11, wherein the first and second hinge legs form a V-shape, and the first and second hinge legs pivot relative to the sleeve around the same axis, the angle of the V being smaller when the rake segments are in the first arrangement than in the second arrangement.

18. A rake according to claim 17, wherein the first and second rake segments have first and second rake segment legs, the first rake segment leg having a first end fixed to the frame and a second end pivotally attached to the first hinge leg, the second rake segment leg having a first end fixed to the frame and a second end pivotally attached to the second hinge leg.

19. A rake according to claim 18, wherein the first and second hinge legs are connected to the sleeve by a rod, the rod being fixed to the sleeve and extending toward the active section.

* * * * *